Dec. 31, 1929.  E. A. LARSSON  1,742,086
CURRENT COLLECTOR
Filed May 3, 1928
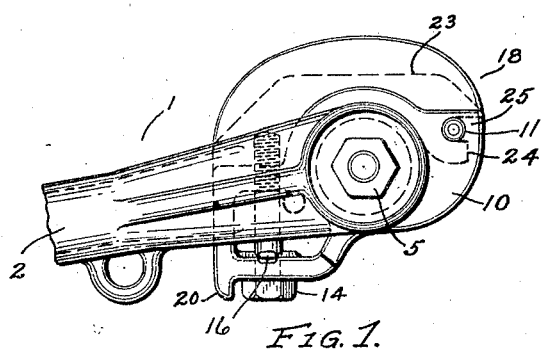
FIG. 1.
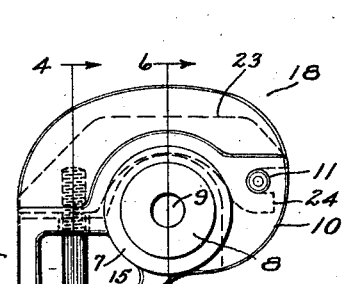
FIG. 3.
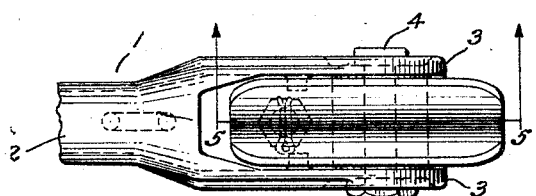
FIG. 2.
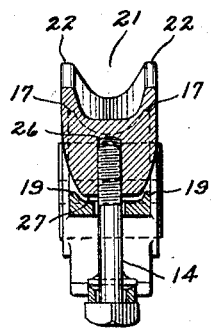
FIG. 4.
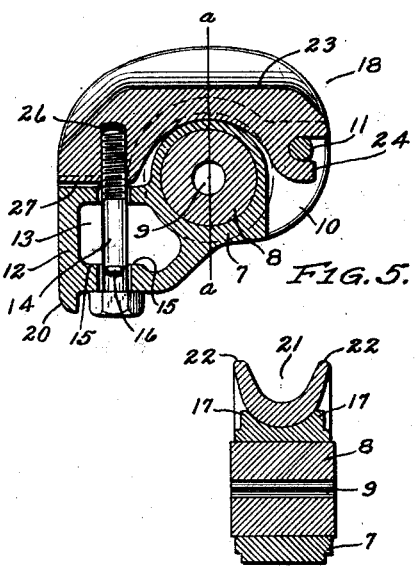
FIG. 5.
FIG. 6.
Witness:
H. J. Stromberger
Inventor
ERNST A. LARSSON
By
Attorney Patented Dec. 31, 1929

1,742,086

UNITED STATES PATENT OFFICE

ERNST A. LARSSON, OF MANSFIELD, OHIO, ASSIGNOR TO THE OHIO BRASS COMPANY, OF MANSFIELD, OHIO, A CORPORATION OF NEW JERSEY

CURRENT COLLECTOR

Application filed May 3, 1928. Serial No. 274,798.

My invention relates to a current collector for use in connection with moving vehicles.

The object of my invention is to provide a simple and efficient current collector of the sliding type for contacting with a trolley wire and which will move forwardly or backwardly with equal efficiency of operation and in which the current from the shoe may be conducted to the harp member without the use of flexible connections, contact springs, etc.

My invention resides in the new and novel construction, combination and relation of the various parts herein described and shown in the accompanying drawing.

In the drawing:—

Fig. 1 is a side view of my invention mounted in a harp member.

Fig. 2 is a top view of Fig. 1.

Fig. 3 is a side view of the shoe and support member assembled.

Fig. 4 is a sectional view on the line 4—4 of Fig. 3.

Fig. 5 is a sectional view on the line 5—5 of Fig. 2.

Fig. 6 is a sectional view on the line 6—6 of Fig. 3.

In the preferred embodiment of my invention I employ a harp member 1 provided with a socket 2 which receives the end of the trolley pole. The harp member also has spaced projecting arms 3 between which is mounted the current collecting shoe and its support. The arms 3 of the harp are provided with registering passages through which is passed the bolt 4 with a nut 5 thereon.

The supporting member 6 is provided with a hub portion 7, provided with a large central passage therethrough to receive the axle 8, which in turn is provided with a passage 9 through which the bolt 4 passes to secure the support 6 in position between the arms 3 and in pivotal relation with respect to the harp member 1.

The hub portion 7 is provided with rearwardly projecting and spaced flanges 10 which are provided with registering passages to receive a through pin 11 which is held in position by riveting the ends or it may be held by threads or other suitable means.

The support 6 is also provided with a forwardly projecting member 12 with an opening 13 formed therein which extends to lighten the device and at the same time reduce cost by saving metal as I prefer to make the member 6 of copper or bronze for electrical conducting reasons. The projecting member 12 is provided with an opening having a vertical axis to receive a bolt or stud 14 which passes through the opening 13. Projecting within the opening 13 and adjacent the bolt 14 are members 15 which form a transverse groove therebetween to receive a spring cotter 16 which passes through the bolt 14, thereby locking the bolt against rotation after the shoe and its support are assembled as later explained. The upper portion of the hub 7 is grooved and is provided with the upwardly spaced flanges 17 between which is positioned the shoe portion 18. The projecting portion 12 is provided on its upper surface with spaced flanges 19 and projecting downwardly on the member 12 is a rib 20 which can be made of various lengths to prevent the span wire catching between the support and harp should the device leave the trolley wire and the shoe rotated to its extreme rearward position.

Mounted on the upper part of the support 6 is a shoe 18 made preferably of very hard steel to prevent wear of the shoe as much as possible as it moves along the trolley wire. The shoe may be made of copper or bronze if desired for electrical conductivity reasons. The shoe is provided with a groove 21 formed between spaced flanges 22 and the bottom portion of the groove forms a flattened surface 23 which contacts with the trolley wire in both its forward and rearward movements. I prefer to position the contact surface 23 such that it is equally divided to both sides of the vertical axis $a$—$a$ passing through the center of the bolt 9 as I find that positioning the contact surface with respect to the pivotal point of support symmetrical with respect to the said vertical axis that the collector may be backed up with less danger of its leaving the trolley wire than when a greater portion of the contact surface rests to one side of the vertical axis $a$—$a$, and I find that such positioning as I propose of the contact surface 23 is made substantially flat throughout its length and then continues in a downward direction at each end and at the bight the connecting surface is rounded and such construction permits the shoe 18 to take obstructions along the trolley wire without being thrown from the wire. The periphery of the flanges 22 is curved throughout the length so as to permit them sliding over special devices which the collector may meet and under span wires without catching and the portion of the flanges extending along the contact surface 23 is of substantially uniform radius such that the movement of the shoe forwardly or backwardly is substantially the same in either direction. The rear end of the shoe 18 is provided with a lip 24 and a transverse groove 25 with the opening to the rear and to receive pin 11 by means of which the rear end of the shoe is locked into position with respect to the support 6. If desired, the lip 24 can be brought downwardly and forwardly from the extreme rear end of the shoe thereby forming the transverse groove 11 with the opening to the forward end of the shoe, which modification is quite obvious. The forward end of the shoe 18 is provided with a threaded recess 26 to receive the threaded end of the bolt 14. The forward end of the shoe is also arranged to be positioned between the flanges 19, which flanges tend to help position the forward end of the shoe with respect to the support 6.

The intermediate portion of the shoe is curved somewhat to set in the groove between the flanges 17 and the construction and relation of the parts is such that the intermediate portion of the shoe will contact with the adjacent portion of the support 6 thereby offering added conductivity contact between the shoe 18 and support 6. I prefer to so proportion the parts that there is a small space 27 between the forward end of the shoe and the forward end of the support such that when the bolt 14 is tightened up it will permit drawing the intermediate portion of the shoe into tight engagement with the adjacent portion of the support and the contact of the shoe with the pin 11 will form, as it were, a fulcrum.

The rear end of the shoe is positioned between the spaced flanges 10 of the support and are therefore held against lateral or transverse displacement.

The axle 8 is made slightly longer than the width of the support and of such a length that it will just fit between the arms 3 of the harp member and when the through bolt 9 is drawn up tight, the end faces of the axle will engage with the inner faces of the arms 3 and form a very efficient electrical connection therewith. The diameter of the sleeve 8 is made very large and therefore it has a large area of contact with the support 6 and the need of a flexible pigtail or connection between the support 6 and the harp is unnecessary and this is a distinct advantage because the pigtails are continually breaking through constant vibration and the conductivity between the shoe and the harp must be high to take care of heavy current requirements. The contact between the shoe and the support 6 is at the rear end and the forward end and intermediate thereof and the latter may be quite extensive in length.

It will be noted that the formation of the flanges 10 is such that there is no possibility of the same catching upon the span wire in case the collector is backed up and should leave the trolley wire.

The device requires no lubrication of its moving parts as the movement is a pivotal or rocking movement and the area of contact between the support 6 and the axle or bushing 8 is very large, therefore the wear per unit area is a minimum and I prefer to make the axle or bushing 8 stationary with respect to the harp. In most devices of this character the axle upon which the parts pivot is no greater than that of the member 9 in my device, which offers small efficiency both mechanically and electrically and requires the use of a pigtail to properly conduct current.

The forward half of my shoe and support combined is heavier than the rear half and, therefore, there is a constant tendency for the forward end of the shoe and support to pivot downwardly, thereby moving the rear end of the shoe upwardly and this has some advantage over certain conditions of operation.

There are no doubt modifications which will suggest themselves to those skilled in the art which are suggested by my disclosure herein, and hence I wish to be limited only by my claims.

I claim:—

1. A current collector comprising a harp member having projecting spaced arms, a bushing clamped between the inner faces of the arms, a transverse member passing through the arms and bushing to hold the parts together and the bushing against rotation, a pivotal support mounted upon the bushing with rearwardly projecting spaced flanges and a transverse pin through the flanges, a forwardly projecting member with a vertical opening therethrough and a bolt therein, a sliding shoe mounted on the support and having a hook portion at one end to engage the said pin between the spaced flanges and to threadably engage with the said bolt to draw the shoe into position and retain it, a ground portion on the shoe having a portion thereof to engage with a trolley wire and the said contact portion disposed substantially equally to the front and rear of a vertical line through the axis of the bushing when the said contact portion is horizontally disposed and the shoe contacting with the support at a point intermediate the ends of the shoe.

2. A current collector comprising a forked harp with spaced arms, a pin through the arms, a bushing on the pin and between the arms, a support pivotally mounted on the bushing, a shoe mounted on the support to pivot therewith, means on the support to interlock with one end of the shoe, means on the shoe intermediate the ends thereof to contact with means on the support, means at the other end of the support to interlock with the other end of the shoe and arranged to draw the said end of the shoe towards the support and contact the shoe with the support and a groove on the edge face of the shoe with a surface to contact with a trolley wire.

3. A current collector comprising a forked harp with spaced arms, a pin through the arms, a bushing on the pin and between the arms, a support pivotally mounted on the bushing, a shoe mounted on the support to pivot therewith, means on the support to pivotally interlock with one end of the shoe, means at the other end of the support to interlock with the other end of the shoe and arranged to draw the said end of the shoe towards the support and contact the shoe with the support and a groove on the edge face of the shoe with a surface to contact with a trolley wire.

4. A current collector comprising a harp having spaced arms, a supporting axle between the arms, a support pivotally mounted on the axle and having a portion of its upper surface grooved to receive therein a grooved and renewable shoe, means to pivotally interlock one end of the shoe to the support and means interlocked with the support to engage with the other end of the shoe to draw it towards the support and the shoe into said groove on the support and retain it there, and a substantially flat elongated surface in the bottom of the groove on the shoe to contact with a trolley wire.

5. A shoe for a current collector comprising a body having transverse slot at one end opening rearwardly, a pair of spaced side walls forming a groove therebetween with a flattened surface to contact with a trolley wire and the ends of said flattened portion extending downwardly and the upper edge of the flanges being curved with respect to the contact surface and means at the other end of the shoe to engage with securing means on a support.

6. A shoe for a current collector comprising a body having transverse slot at one end, a pair of spaced side walls forming a groove therebetween with a flattened surface to contact with a trolley wire and the ends of said flattened portion extending downwardly and the upper edge of the flanges being curved with respect to the contact surface and means at the other end of the shoe to engage with securing means on a support.

In testimony whereof I affix my signature.

ERNST A. LARSSON.